United States Patent
Lee

(10) Patent No.: US 8,970,797 B2
(45) Date of Patent: Mar. 3, 2015

(54) LIQUID CRYSTAL DISPLAY ADOPTING STRUCTURE OF LIQUID CRYSTAL LENS

(75) Inventor: Yunbok Lee, Beijing (CN)

(73) Assignees: Boe Technology Group Co., Ltd., Beijing (CN); Hefei Boe Optoelectronics Technology Co., Ltd., Hefei, Anhui (CN)

( * ) Notice: Subject to any disclaimer, the term of this patent is extended or adjusted under 35 U.S.C. 154(b) by 28 days.

(21) Appl. No.: 13/697,761

(22) PCT Filed: Jul. 24, 2012

(86) PCT No.: PCT/CN2012/079100
§ 371 (c)(1),
(2), (4) Date: Nov. 13, 2012

(87) PCT Pub. No.: WO2013/013612
PCT Pub. Date: Jan. 31, 2013

(65) Prior Publication Data
US 2013/0235304 A1    Sep. 12, 2013

(30) Foreign Application Priority Data
Jul. 25, 2011    (CN) .......................... 2011 1 0209362

(51) Int. Cl.
*G02F 1/1335* (2006.01)
*G02F 1/13* (2006.01)
(Continued)

(52) U.S. Cl.
CPC .... *G02F 1/133514* (2013.01); *G02F 1/133526* (2013.01); *G02F 1/29* (2013.01); *G02F 1/133371* (2013.01); *G02F 2001/291* (2013.01); *G02F 2001/294* (2013.01); *G02F 2203/62* (2013.01)

USPC .............................................. 349/13; 349/200

(58) Field of Classification Search
CPC ......................................................... G02F 1/29
USPC ........................................... 349/200–202, 13
See application file for complete search history.

(56) References Cited

U.S. PATENT DOCUMENTS

| | | | |
|---|---|---|---|
| 5,815,229 A * | 9/1998 | Shapiro | 349/95 |
| 2004/0105038 A1* | 6/2004 | Hashimoto et al. | 349/5 |

(Continued)

FOREIGN PATENT DOCUMENTS

| | | |
|---|---|---|
| CN | 101395928 A | 3/2009 |
| CN | 101676765 A | 3/2010 |

(Continued)

OTHER PUBLICATIONS

Kim et al., Display Device, Feb. 5, 2010, Machine translation of KR 10-20090079290 A from Korean Intellectual Property Rights Information Service (KIPRIS) website, all pages.*

(Continued)

*Primary Examiner* — Dennis Y Kim
(74) *Attorney, Agent, or Firm* — Ladas & Parry LLP

(57) ABSTRACT

According to the present disclosure, there is provided a liquid crystal display, comprising: a color filter substrate; an array substrate, disposed to face the color filter substrate; and a liquid crystal lens structure, disposed between the array substrate and the color filter substrate, the liquid crystal lens structure comprising in sequence along a direction from the color filter substrate to the array substrate: a first surface alignment layer, a liquid crystal layer and a second surface alignment layer.

13 Claims, 6 Drawing Sheets

(51) Int. Cl.
   *G02F 1/29* (2006.01)
   *G02F 1/1333* (2006.01)

(56) References Cited

U.S. PATENT DOCUMENTS

| | | | |
|---|---|---|---|
| 2006/0209250 A1* | 9/2006 | Holmes | 349/202 |
| 2009/0033812 A1 | 2/2009 | Ijzerman et al. | |
| 2012/0242913 A1* | 9/2012 | Miyazawa et al. | 349/5 |

FOREIGN PATENT DOCUMENTS

| | | |
|---|---|---|
| JP | 2006-337846 A | 12/2006 |
| KR | 20090079290 A | 7/2009 |

OTHER PUBLICATIONS

Hyung-Ki Hong, et al; "25.3: Autostereoscopic 2D/3D Switching Display Using Electri-Field-Driven LC Lens (ELC Lens)", SID Symposium Digest of Technical Papers, vol. 39, Issue 1, pp. 348-351; May 2008.

Sergiy Valyukh; "44.3; A Liquid Crystal Lens with Non-uniform Anchoring Energy", SID Symposium Digest of Technical Papers, vol. 39, Issue 1, pp. 659-662; May 2008.

International Search Report mailed Aug. 11, 2012; PCT/CN2012/079100.

First Chinese Office Action dated Sep. 6, 2013; Appln. No. 201110209362.8.

International Preliminary Report on Patentability dated Jan. 28, 2014; PCT/CN2012/079100.

Second Chinese Office Action date Apr. 4, 2014; Appln. No. 201110209362.8.

Third Chinese Office Action dated Oct. 30, 2014, Appln. No, 201110209362.8.

* cited by examiner

LIQUID CRYSTAL DISPLAY ADOPTING STRUCTURE OF LIQUID CRYSTAL LENS

FIELD OF THE INVENTION

The present disclosure relates to a liquid crystal display adopting a liquid crystal lens structure.

BACKGROUND

Currently, Micro-Electro-Mechanical Systems (MEMS) is a known technology. However, as its structure suffers from issues which are difficult to be overcome in the course of commercialized application, research on its commercialized application is still being conducted continually.

FIGS. 1-1 and 1-2 illustrate an operationally basic principle, where a telescopic pixel 108 is adopted, and the pixel 108 comprises a transparent indium tin oxide (ITO) electrode 107, a glass 104, a first mirror (hanging thin film) 105 and a second mirror 106. In the state as shown in FIG. 1-1, a parallel, background light 103 emitted from left to right by a backlight source passes through the glass 104, but may not be transmitted by the first mirror (hanging thin film) 105 and the second mirror 106 which are disposed on a display device so as to be reflected. Accordingly, as seen by a viewer 101, what is shown on a screen 102 is a black picture. While in the state as shown in FIG. 1-2, the setting of the second mirror 106 remains the same, but a voltage is applied to the first mirror (hanging thin film) 105 to make it deflected. Accordingly, reflected light with a deflection angle will be formed when the parallel background light 103 from the backlight source irradiates onto the first mirror 105. The reflected light exits through pixels after it has been reflected secondarily by the second mirror 106, so as to be captured by the viewer 101. Thus, an object of displaying by use of projective light is realized.

A MEMS display scheme based on the above technical principle has been suggested many times, but hitherto, it has not been applied in the sense of batch production for commercialization successfully. The main reason is that, in terms of electrode formation, the formation process of a MEMS structure has high difficulty, a low productivity and an expensive production cost. Therefore, it is difficult to produce it in batches for commercialization.

Regarding a liquid crystal lens (LC lens), whose optical characteristics are similar to those of a liquid crystal display, liquid crystals are filled between panels formed with electrodes, and are driven in accordance with an externally applied voltage to make a path difference being produced between light transmitted through the liquid crystals, thereby causing its focal length f to change. More specifically, as shown in FIG. 2, k is the focal length f, and k(x) denotes a diagonal distance for f, the diagonal distance being a diagonal length which is determined according to f and a vertical distance x; an angle γ is a function relating to a space distance of an anchoring energy W(x), an applied voltage V and a cell gap d, which is similar to insulation property, elasticity and optical constants of liquid crystals. With respect to a certain liquid crystal, the angle γ can be defined as follows:

$$\gamma(W(x) \cdot V \cdot d) = \arctan\left(\frac{x}{f}\right),$$

Wherein, f is the focal length of a lens, and when a constant V is applied to a liquid crystal unit as the lens and d and f are constant, the space distance of the anchoring energy W(x) can be calculated from the above formula. In addition, applying a different voltage V can change the focal length f. Research on how to evaluate potential abilities of the adjustable liquid crystal lens is currently being conducted continually.

In a publicly issued document "SID 2008: A Liquid Crystal Lens with Non-uniform Anchoring Energy", an example in which a liquid crystal lens is adopted is provided. The liquid crystal lens is disposed between two glass substrates, and a structure of liquid crystal display is formed on the structure of the liquid crystal lens having liquid crystals placed therein, so as to attain a display effect of three-dimensional image. Here, the liquid crystal lens functions as a concave lens and a convex lens in accordance with an electrode structure within the substrates, an alignment of liquid crystals and an externally applied voltage.

Furthermore, in a publicly issued document "SID 2008: 25.3: Autostereoscopic 2D/3D Switching Display Using Electric-Field-Driven LC Lens (ELC Lens)", two methods for adjusting a focal length by applying an electric field are provided. As shown in FIGS. 3-1 and 3-2, in the states of turning-on and -off of a switch, respectively, on/off states of light transmitted through the lens are driven by a change of a liquid crystal convex lens based on a convex structure; while regarding FIGS. 3-3 and 3-4, in the states of turning-on and -off of the switch, they are driven by a polarization switch based on an anisotropic lens.

As seen from above, in the current technical environment, it has brought about concern of more and more research subjects how to achieve an object of projecting light, through adjustment of a focal distance of a liquid crystal lens by means of changing an externally applied voltage, and directional adjustment of light using structure of the liquid crystal lens and the reflection principle, in a MEMS structure.

SUMMARY

A liquid crystal display is provided by the present disclosure, which comprises: a color filter substrate; an array substrate, disposed to face the color filter substrate; and a liquid crystal lens structure, disposed between the array substrate and the color filter substrate, the liquid crystal lens structure comprising in sequence along a direction from the color filter substrate to the array substrate: a first surface alignment layer, a liquid crystal layer and a second surface alignment layer.

BRIEF DESCRIPTION OF THE DRAWINGS

In order to clearly illustrate the technical solution of the embodiments of the invention, the drawings of the embodiments will be briefly described in the following; it is obvious that the described drawings below are only related to some embodiments of the invention and thus are not limitative of the invention.

FIG. 2 is a functionally schematic view showing an existing liquid crystal lens;

FIGS. 3-1 to 3-4 are schematic views showing that a focal distance is adjusted by an externally applied voltage in an existing liquid crystal lens structure; where, 301: a glass; 302: a transparent layer; 303: a liquid crystal layer; 304: a polarizer; 305: a substrate; 306: a polarizing active micro-lens; 307: a polarization switch (TN);

FIG. 4-1 is a structurally schematic view showing a liquid crystal display which comprises a convex liquid crystal lens in an initial state; FIG. 4-2 is a structurally schematic view showing the liquid crystal display which comprises the convex liquid crystal lens in an electrified state; where, 401: a transparent layer; 402: a liquid crystal layer; 403: a polarizer; 404: a first reflective plate; 405: a second reflective plate;

FIG. 5-1 is a structurally schematic view showing a liquid crystal display which comprises a concave liquid crystal lens in an initial state; FIG. 5-2 is a structurally schematic view showing the liquid crystal display which comprises the concave liquid crystal lens in an electrified state; where, 501: a transparent layer; 502: a liquid crystal layer; 503: a polarizer; 504: a first reflective plate; 505: a second reflective plate;

DETAILED DESCRIPTION

In order to make objects, technical details and advantages of the embodiments of the invention apparent, hereinafter, technical solutions in embodiments of the present invention will be clearly and fully described in combination with the accompanied drawings in the embodiments of the present invention. Apparently, the embodiments to be described are merely a part but not all of embodiments of the present invention. Every other embodiment as would be obvious to those ordinarily skilled in the art on the basis of described embodiments in the present invention without creative work, comes within the protection scope of the present invention.

To solve the above technical issues, according to the present disclosure, there is provided a liquid crystal display adopting a liquid crystal lens structure, which comprises a color filter substrate and an array substrate, the liquid crystal display further comprising: a liquid crystal lens structure, which is disposed between the array substrate and the color filter substrate, and each of them comprises in sequence along a direction from the color filter substrate to the array substrate: an upper surface alignment layer, a liquid crystal layer and a lower surface alignment layer. The liquid crystal display further comprises a direct-light-type backlight structure. For example, the direct-light-type backlight structure is disposed on a side of the array substrate opposed to the filter substrate, i.e. a light emitted by the backlight structure is incident into the liquid crystal display from a side on which the array substrate is located. The direct-light-type backlight structure can emit a parallel light toward the array substrate.

A liquid crystal display according to embodiments of the present disclosure may comprise a plurality of pixel areas arranged in a two-dimensional matrix. For example, each of the pixel areas may comprise one of the above liquid crystal structures.

The liquid crystal display further comprises: a first reflective plate, disposed on a side of a color filter substrate facing the liquid crystal lens structure; a second reflective plate, disposed on a side of an array substrate facing the liquid crystal lens structure. In each of the pixel areas, the first reflective plate and the second reflective plate each only cover a part of the pixel area, and the first reflective plate is disposed at least on a region which is not covered by the second reflective plate. Materials for the first reflective plate and the second reflective plate can be selected as substances blocking and reflecting light, such as a metal, etc. A transparent electrode is disposed on each of the color filter substrate and the array substrate, and acts to perform a voltage control on the liquid crystal layer.

Figure 1:
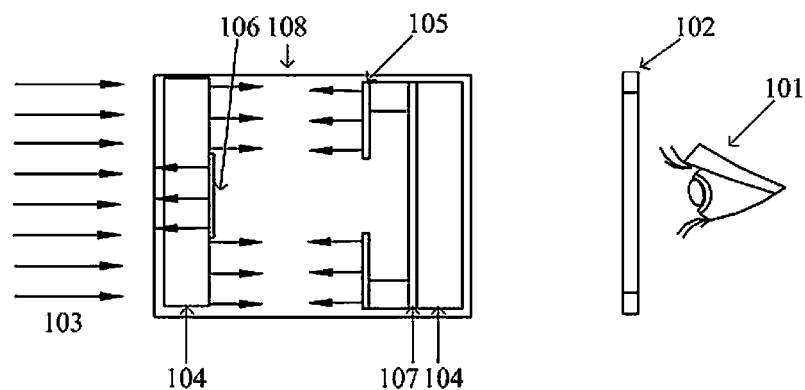
FIGS. 1-1 and 1-2 are schematic views showing an existing MEMS display structure; where, 101: an viewer; 102: a screen; 103: a parallel background light; 104: a glass; 105: a first mirror; 106: a second mirror; 107: a transparent ITO electrode; 108: a telescopic pixel.
Figures 1, 2:
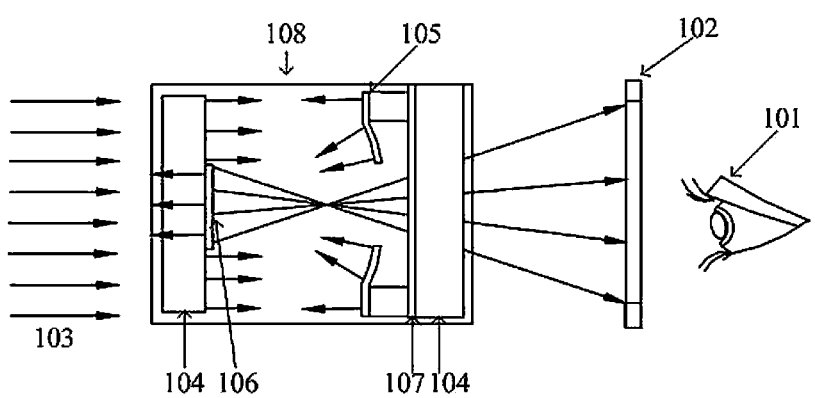
Figure 2:
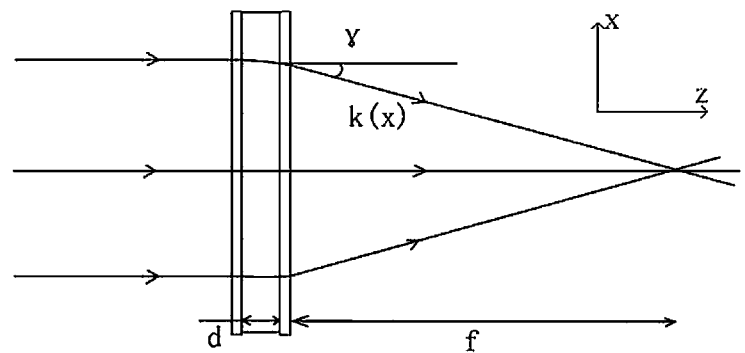
Figures 1, 3:
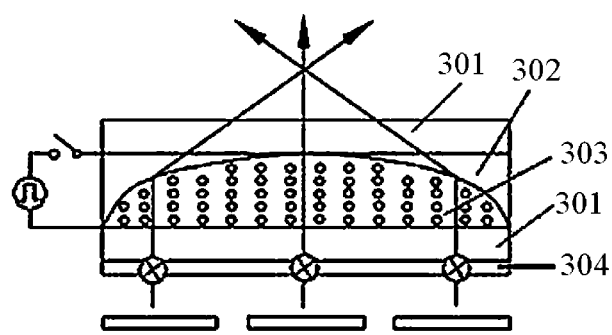
Figures 2, 3:
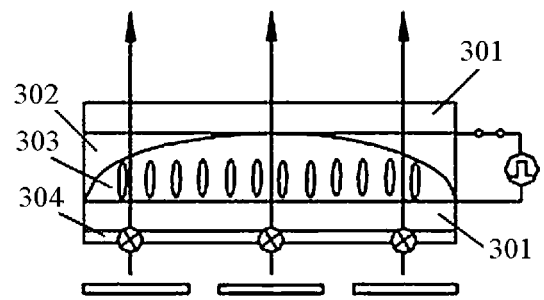
Figure 3:
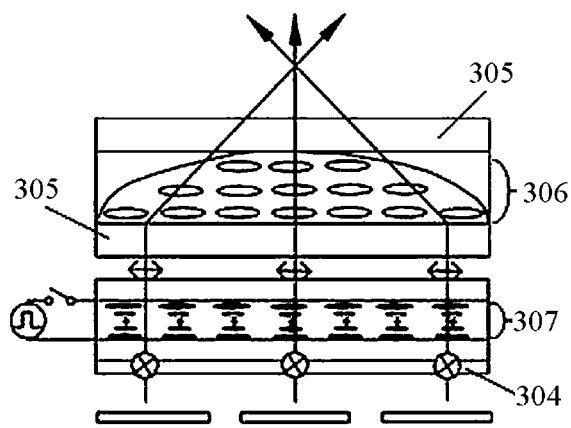
Figures 3, 4:
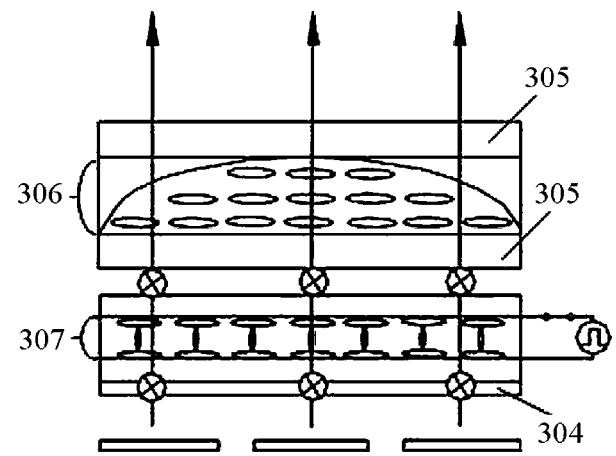
Figures 1, 4:
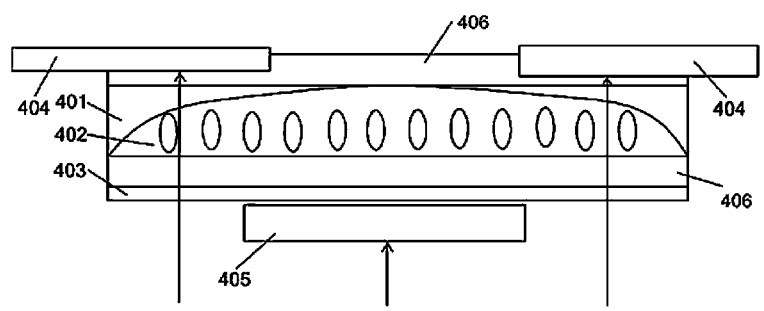
Figures 2, 4:
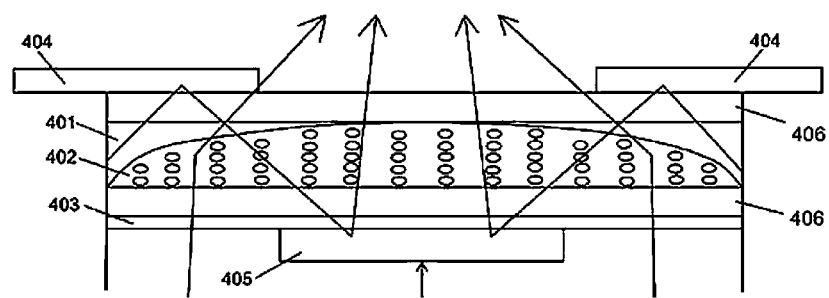

FIGS. 4-1 and 4-2 illustrate a structure of liquid crystal display according to an embodiment of the present disclosure, in which only a structure of one pixel area is illustrated. In the embodiment, a first reflective plate 404 can be set as two pieces, the two pieces of the first reflective plate 404 are disposed on locations at two ends of the pixel area, respectively, and are disposed on a side of a color filter substrate facing the liquid crystal lens structure; and the second reflective plate 405 is set as a piece, is placed in a middle place of the pixel area, and is disposed on a side of an array substrate facing the liquid crystal lens structure. The two pieces of the first reflective plate 404 and the piece of the second reflective plate 405 are sized so that a sum of areas of the three pieces of reflective plate is equal to an area of the pixel area. Here, the liquid crystal lens structure is set as a convex lens structure. A transparent layer 401 is a resin layer, for example. The setting procedure of the convex lens structure or a concave lens structure is also very simple. As shown in figures, if a curved face is set upward, it acts as a convex lens, and focuses projective light; while if the curved face is set downward, it acts a concave lens, and diffuses transmitted light. Further, transparent electrodes (not shown) are each disposed on base substrates (e.g. glass plates) 406 of the color filter substrate and the array substrate, so as to perform control on a liquid crystal layer. For example, an electric field is formed between the transparent electrode on the color filter substrate and the transparent electrode on the array substrate, so as to perform control on the liquid crystal layer.

FIGS. 4-1 and 4-2 illustrate examples in which the convex liquid crystal lens is applied into a direct-view reflective type liquid crystal display. As shown in FIG. 4-1, in an initial state where upper and lower electrodes are not electrified by a switch, liquid crystals are vertically aligned through an alignment layer, direct light incident from a backlight source is firstly reflected back by a second reflective plate 405 in part, and then remaining light transmitted by the structure of the liquid crystal layer 402 will travel straightly, and is wholly reflected by a first reflective plate 404. Thus, a black screen display can be achieved. In the structure, it is possible that a polarizer is not be used, or a polarizer 403 is disposed on a face of the array substrate as shown in figures. As shown in FIG. 4-2, the switch electrifies the upper and lower electrodes to make the liquid crystal layer 402 reacts, and liquid crystals move in accordance with the upper and lower electrodes in turn. As such, retardation will happen, and accordingly, a travel direction of the light will change. The direct light is driven by a liquid crystal lens shown as a convex lens so that a path of the light shifts. A part of the light whose path shifts will be transmitted directly, and another part of the light will be transmitted after being subjected to a reflective process (e.g., it is reflected by surfaces of the first reflective plate 404 and the second reflective plate 405 facing the liquid crystal layer), so that gray, white and other colors are shown on a display panel. Thus, a display effect is realized.

Figures 1, 5:
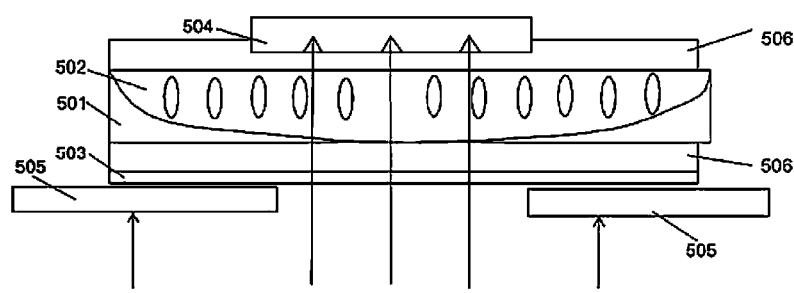
Figures 2, 5:
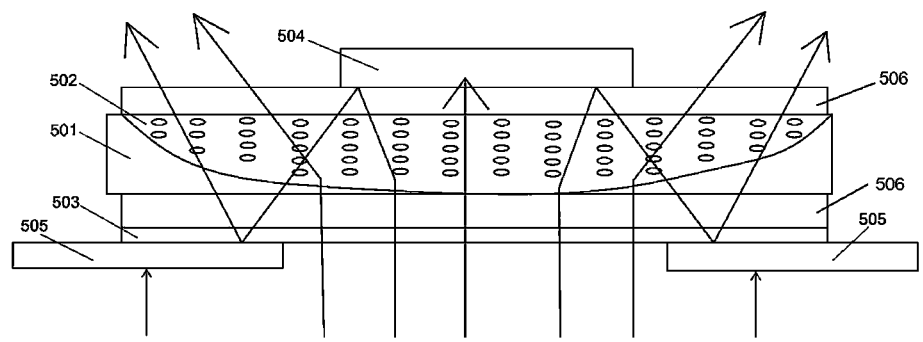

FIGS. 5-1 and 5-2 illustrate a structure of liquid crystal display according to another embodiment of the present disclosure, in which only a structure of one pixel area is illustrated. In the embodiment, the first reflective plate 504 can be set as a piece, is placed in a middle place of the pixel area, and is disposed on a side of a color filter substrate facing the liquid crystal lens structure; and the second reflective plate 505 is set as two pieces, the two pieces of the second reflective plate 505 are disposed on locations at two ends of the pixel area, respectively, and are disposed on a side of an array substrate facing the liquid crystal lens structure. The two pieces of the first reflective plate 504 and the piece of the second reflective plate 505 are sized so that a sum of areas of the three pieces of reflective plate is equal to an area of the pixel area. Here, the liquid crystal lens structure is set as a concave lens structure. A transparent layer 501 is a resin layer, for example. Further, transparent electrodes (not shown) are each disposed on base substrates 506 (e.g. glass plates) of the color filter substrate and the array substrate, so as to perform control on a liquid crystal layer. For example, an electric field is formed between the transparent electrode on the color filter substrate and the transparent electrode on the array substrate, so as to perform control on the liquid crystal layer.

FIGS. 5-1 and 5-2 illustrate examples in which the concave liquid crystal lens is applied into a direct-view reflective type liquid crystal display. As shown in FIG. 5-1, in an initial state where power is turned off by a switch, liquid crystals are vertically aligned through an alignment layer, direct light incident from a backlight source is firstly reflected back by the second reflective plate 505 in part, and then remaining light transmitted by a structure of the liquid crystal layer 502 will travel straightly, and is wholly reflected by the first reflective plate 504. Thus, a black screen display can be achieved. In the structure, it is possible that a polarizer is not be used, or a polarizer 503 is disposed on a face of the array substrate as shown in figures. As shown in FIG. 5-2, in the case where power is turned on by the switch, liquid crystals move in accordance with upper and lower electrodes. As such, retardation will happen, and accordingly, a travel direction of the light will change. The direct light is driven by a liquid crystal lens shown as a concave lens so that a path of the light shifts. A part of the light whose path shifts will be transmitted directly, and another part of the light will be transmitted after being subjected to a reflective process (e.g., it is reflected by surfaces of the first reflective plate 504 and the second reflective plate 505 facing the liquid crystal layer), so that gray, white and other colors are shown on a display panel. Thus, a display effect is realized.

Certainly, in the above technical solutions, it is possible that a polarizer is disposed on the array substrate, or no polarizer is disposed on each of the color filter substrate and the array substrate. Although a case where a polarizer is disposed is illustrated in each of FIG. 4-1 to FIG. 5-2, it should be understandable that, even if no polarizer is disposed, a function of selectively transmitting can still be achieved and a LCD display effect with higher luminance can also be obtained.

Figure 6:
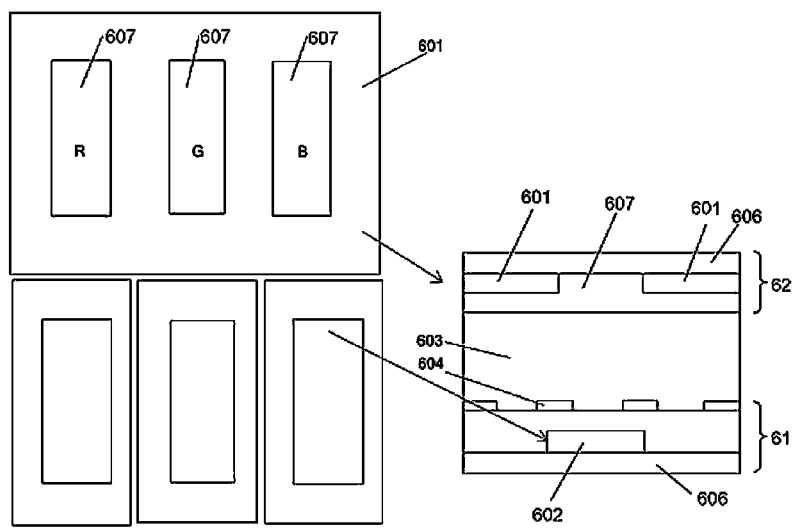
FIG. 6 is a structurally schematic view showing substrates of a reflective type provided by the present disclosure; where, 601: a reflective plate for a color filter substrate; 602: a reflective plate for an array substrate; 603: a liquid crystal layer; 604: an electrode.

FIG. 6 illustrates an embodiment in which the above structure of liquid crystal lens is applied into a thin film transistor liquid crystal display (TFT-LCD) so as to attain a display with a novel reflective structure suggested by the present disclosure. The embodiment is embodied as an example of color display practically. Further, in the specification, the pixel area refers to a minimum unit on a display for controlling transmittance of light. For example, in FIG. 6, three pixel areas of R, G and B are illustrated in a plan view on the left, and only one pixel area is illustrated as an example in a cross-sectional view on the right.

On an array substrate 61, a transparent electrode 604 is formed to perform control on a liquid crystal layer 603, and a reflective plate 602 for the array substrate (i.e. the above second reflective plate) is formed on the array substrate, and a reflective plate 601 (i.e. the above first reflective plate) for a color filter substrate is formed on the color filter substrate 62. In addition, red (R), green (G) and blue (B) filters 607 are disposed on the color filter substrate. Of course, the present disclosure is not limited to the above filter layers of three colors, and can be properly selected according to requirements. Also, each pixel area corresponds to a filter, and the filters 607 are disposed at locations corresponding to the reflective plate 602 for the array substrate, so that light transmitted when pixels are lighted is colored through the filters 607. Furthermore, the array substrate 61 and the color filter substrate 62 can each comprise a base substrate 606 (e.g. a glass plate). Further, in the embodiment of FIG. 6, a plurality of transparent electrode patterns 604 are only formed on a lower substrate 61, and a transverse electric field can be produced between the plurality of transparent electrode patterns 604 to drive liquid crystals. When no electrode voltage is applied in an initial operation status of a display, the liquid crystals are vertically aligned, and the display maintains a black screen condition; while an electric field is applied to make the liquid crystals react and make the direction of the light change, they function in the form of a liquid crystal lens (a convex lens in figures) to achieve display, thereby presenting a variety of colors (colors corresponding to the filters).

In the present disclosure, the liquid crystal display adopting the structure of liquid crystal lens is provided, a display effect can be showed by the liquid crystals and a higher luminance can be represented, even if no polarizer is provided, by means of providing the concave or convex structure of liquid crystal lens in the liquid crystal display adopting a direct-light-type backlight source and controlling the arrangement of the liquid crystal layer using an externally connected voltage. Furthermore, as there is a rather large free degree to set the polarizer, and the polarizer can be provided only on a single side, or even no polarizer is provided on double sides, the production cost in manufacturing process of the liquid crystal display can be reduced effectively.

Finally, it should be noted that the foregoing embodiments are merely used to illustrate the present disclosure and are not to be construed as limiting of this disclosure. Although the present disclosure are described in detail with reference to foregoing embodiments, it will be apparent to one of ordinary skill in the art that modifications may be made to the technical solutions described by the foregoing embodiments or equivalent replacements may be made to a part of technical features therein. These modifications and replacements would not depart the essence of the corresponding technical solutions from the spirit and scope of the technical solutions of embodiments.

What is claimed is:

1. A liquid crystal display, comprising:
a color filter substrate;
an array substrate, disposed to face the color filter substrate;
a liquid crystal lens structure, disposed between the array substrate and the color filter substrate, the liquid crystal lens structure comprising in sequence along a direction from the color filter substrate to the array substrate: a first surface alignment layer, a liquid crystal layer and a second surface alignment layer;
a plurality of pixel areas arranged in a two-dimensional matrix, and each of the pixel areas comprising one liquid crystal lens structure;
a first reflective plate, disposed on a side of the color filter substrate facing the liquid crystal lens structure;
a second reflective plate, disposed on a side of the array substrate facing the liquid crystal lens structure,
wherein in each of the pixel areas, the first reflective plate and the second reflective plate each cover only a part of the pixel area, and the first reflective plate is disposed at least on a region of the pixel areas which is not covered by the second reflective plate.

2. The liquid crystal display claimed as claim 1, wherein transparent electrodes are disposed on each of the color filter substrate and the array substrate, and an electric field is formed between the transparent electrode on the color filter substrate and the transparent electrode on the array substrate to perform control on the liquid crystal layer.

3. The liquid crystal display claimed as claim 1, wherein two pieces of the first reflective plate and one piece of the second reflective plate are included in each of the pixel areas, the two pieces of the first reflective plate are disposed on locations at two ends of the pixel area, and the second reflective plate is disposed in a middle place of the pixel area.

4. The liquid crystal display claimed as claim 3, wherein the liquid crystal lens structure is set as a convex lens structure.

5. The liquid crystal display claimed as claim 3, wherein a sum of areas of the first reflective plate and the second reflective plate is equal to an area of the pixel area.

6. The liquid crystal display claimed as claim 1, wherein one piece of the first reflective plate and two pieces of the second reflective plate are included in each of the pixel areas, the first reflective plate is disposed in a middle place of the pixel area, and the two pieces of the second reflective plate are disposed on locations at two ends of the pixel area respectively.

7. The liquid crystal display claimed as claim 6, wherein the liquid crystal lens structure is set as a concave lens structure.

8. The liquid crystal display claimed as claim 6, wherein a sum of areas of the first reflective plate and the second reflective plate is equal to an area of the pixel area.

9. The liquid crystal display claimed as claim 1, wherein a polarizer is disposed on the array substrate.

10. The liquid crystal display claimed as claim 1, wherein the liquid crystal display further comprises a direct-type backlight source structure.

11. The liquid crystal display claimed as claim 10, wherein the direct-type backlight source structure is disposed on a side of the array substrate opposed to the color filter substrate.

12. The liquid crystal display claimed as claim 1, further comprising a filter located on the color filter substrate, the filter being disposed on a location corresponding to the second reflective plate.

13. The liquid crystal display claimed as claim 1, wherein a plurality of transparent electrode patterns are disposed only on the array substrate, and a transverse electric field is produced between the plurality of transparent electrode patterns to perform a voltage control on the liquid crystal layer.

* * * * *